(12) United States Patent
Ting et al.

(10) Patent No.: US 8,342,977 B2
(45) Date of Patent: Jan. 1, 2013

(54) AUTOMATIC BABY SWING

(75) Inventors: Bernie Ting, Hong Kong (CN); Yau Choi Tse, Dalang Town (CN); Chi Fai Chan, Hong Kong (CN)

(73) Assignee: Max Technology Capital Ltd, Aberdeen (HK)

( * ) Notice: Subject to any disclaimer, the term of this patent is extended or adjusted under 35 U.S.C. 154(b) by 211 days.

(21) Appl. No.: 12/597,085

(22) PCT Filed: Apr. 23, 2008

(86) PCT No.: PCT/US2008/061353
§ 371 (c)(1),
(2), (4) Date: Jul. 14, 2010

(87) PCT Pub. No.: WO2008/131449
PCT Pub. Date: Oct. 30, 2008

(65) Prior Publication Data
US 2010/0298058 A1 Nov. 25, 2010

Related U.S. Application Data

(60) Provisional application No. 60/926,063, filed on Apr. 23, 2007.

(51) Int. Cl.
*A63G 9/16* (2006.01)
*A63G 9/00* (2006.01)
(52) U.S. Cl. ..................................... 472/119
(58) Field of Classification Search .......... 472/118–125; 318/443, 444, 466–468, 560, 565, 600–603, 318/626, 640
See application file for complete search history.

(56) References Cited

U.S. PATENT DOCUMENTS

| | | | | |
|---|---|---|---|---|
| 5,376,053 A | * | 12/1994 | Ponder et al. | 472/119 |
| 5,525,113 A | * | 6/1996 | Mitchell et al. | 472/119 |
| 5,833,545 A | * | 11/1998 | Pinch et al. | 472/119 |
| 5,846,136 A | * | 12/1998 | Wu | 472/119 |
| 6,254,490 B1 | * | 7/2001 | Lawson et al. | 472/119 |
| 6,339,304 B1 | * | 1/2002 | Allison et al. | 318/443 |
| 6,814,670 B2 | * | 11/2004 | Morita et al. | 472/119 |
| 6,916,249 B2 | * | 7/2005 | Meade | 472/119 |
| 7,874,927 B2 | * | 1/2011 | Godiska | 472/119 |
| 7,905,791 B2 | * | 3/2011 | Guang et al. | 472/119 |

* cited by examiner

Primary Examiner — Kien Nguyen
(74) Attorney, Agent, or Firm — Robert W. J. Usher

(57) ABSTRACT

The amplitude of a swing powered by an electric motor is controlled by detecting a peak voltage induced in the motor coil by the swing motion when the motor is not being powered and comparing the detected voltage with a one of a set of pre-measured reference values of peak voltages obtained at corresponding amplitude settings to provide a signal to a motor controller which adjusts the power supplied to the motor to bring the swing amplitude to. The motor controller supplies a PWM signal voltage to power the motor and adjusts the voltage on-time to bring or restore the swing to the selected amplitude.

7 Claims, 4 Drawing Sheets

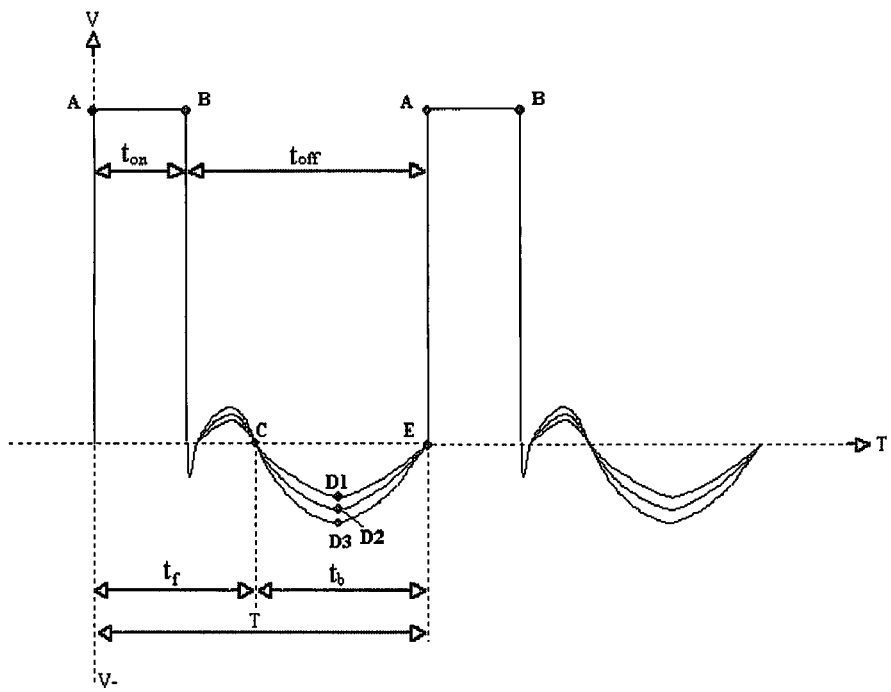
FIGURE 1
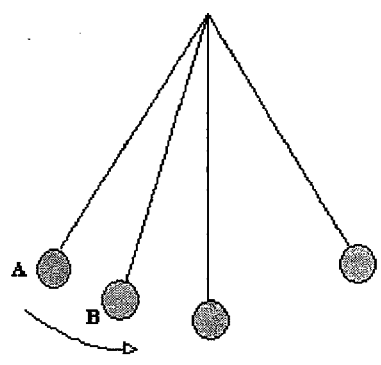
FIGURE 2. Forward swing (counterclockwise).
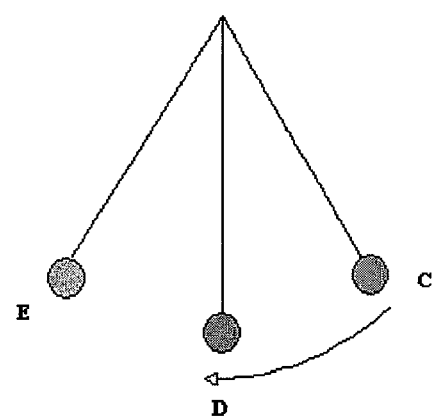
FIGURE 3. Backward swing (clockwise).

AUTOMATIC BABY SWING

RELATED APPLICATION

Priority is claimed from provisional application 60/926,063 titled Automatic Baby Swing, filed Apr. 23, 2007, the disclosure of which is incorporated herein by reference.

FIELD OF THE INVENTION

The invention relates to swings and, in particular, to automatic baby swings.

BACKGROUND OF THE INVENTION

Automatic baby swings powered by electric stepping motors have been in widespread use for many years.

In some prior swings, a desired swing amplitude (angle) can be selected by the user turning a dial mechanism between different predetermined settings to adjust the electric power supplied to the motor. However, it is necessary to compensate for weight differences between different babies or possibly arising from other external variables such as changing wind resistance from the size of a child or prevailing weather conditions which result in unwanted changes in swing amplitude.

In one prior approach taught by U.S. Pat. No. 6,339,304, issued 2002 to Allison et al, the disclosure of which is incorporated herein by reference, compensation is provided by automatically varying the power applied to the motor when the actual swing amplitude deviates from a preselected swing amplitude. However, Allison requires an additional mechanical device comprising a series of light interrupting prongs mounted for movement by the swing between an IRLED and a photodetector and means for counting the number of resulting light interruptions which varies according to the swing amplitude. Such approach may be regarded as relatively cumbersome and possibly not wholly reliable over the swing life, as a result of the requirement to maintain accurate mechanical alignment of the prongs between the LED and the photodetector.

SUMMARY OF THE INVENTION

An object of the invention is to provide a baby swing which can compensate automatically for changes in the resistance to motion arising, for example, from variations in body weight or wind resistance and other factors, while obviating the requirement for potentially unreliable additional external mechanical structures.

According to one aspect, the invention provides a method for controlling the amplitude of a swing powered by an electric motor comprising the steps of detecting a change from a predetermined value of an electrical parameter induced in the motor by the swinging movement and varying power supplied to the motor to compensate for the change thereby to restore the swing amplitude to a preselected amplitude.

More particularly, the maximum voltage induced in the motor by the swinging movement during a part of the cycle when the motor is not under power is sensed and compared with a predetermined voltage corresponding to the desired amplitude to provide a signal which is fed back to a motor controller which adjusts the power fed to the motor during a motor powered part of the swing cycle thereby to compensate for the change in swing amplitude.

Thus, the invention exploits the characteristic that an electric motor generates an electrical parameter such as emf/voltage by movement of the induction coils in a magnetic field. The induced emf is proportional to the speed of coil movement and therefore the amplitude (angle) of the swing. The induced emf is detected and measured when power is not being supplied to the motor, compared with predetermined known values of emf corresponding to specified swing amplitudes and a signal representing the difference fed back to adjust the power supplied to the motor.

For example, in one practical embodiment, the motor is powered by a pulse train (PWM), detection and measurement is made at the motor terminals during the intervals between successive voltage pulses when the swing is adjacent the lowest point of travel corresponding to the peak velocity and maximum emf/voltage generation and the duration or width of the on-time adjusted to adjust the motor driven time of the swing accordingly.

Unwanted variations in swing amplitude can thereby be avoided automatically irrespective of the actual load or wind resistance (within limits) without requirement for manual intervention.

Thus, a completely 'hands off' operation of the swing is possible without even a push start being required.

According to another aspect, the invention provides a device for controlling the amplitude of an electric motor powered swing comprising an electric motor operatively connected to the swing; a motor controller for adjusting electrical power supplied to the motor; a swing amplitude detection circuit connected to motor coil terminals to measure a current voltage induced in the motor coil only by current swing movement; means for providing selected reference voltages corresponding to respective predetermined voltages induced in the motor coil only by swing movement at selected swing amplitudes; means for comparing the current voltage with a selected reference voltage and for providing a difference signal to the motor controller so as to adjust the electrical power supplied to the motor to bring the current swing amplitude to the selected swing amplitude.

More particularly, the motor controller supplies power to the motor for only a part of the swing cycle and the selected reference voltages correspond to peak voltages induced in the motor coil at a point in the swing cycle when the motor is not powered and the current voltage is measured at a corresponding point in the swing cycle.

Preferably, the motor controller provides a PWM signal to power the motor and adjusts the on-time in response to the difference signal to adjust the power supplied to the motor.

In a practical embodiment of the invention, the swing structure comprises a T-bar, the upper cross bar of which is connected to the motor output shaft to effect the pendulous or swinging action.

BRIEF INTRODUCTION TO THE DRAWINGS

In order that the invention may be readily understood, an embodiment thereof will now be described with reference to the accompanying drawings in which:

FIG. 1 is a graph showing the variations in motor terminal voltage, (or voltage waveform trace), at various times throughout the swing cycle;

FIG. 2 is a diagram showing the physical positions of the swing during forward movement corresponding at particular cycle times referred to in FIG. 1;

FIG. 3 is a diagram showing the physical positions of the swing during return movement corresponding to the particular cycle times identified in FIG. 1;

PARTICULAR EMBODIMENT

As shown in FIG. 1, $t_{on}$ and $t_{off}$ are the on-time and is the off-time of PWM, respectively; $t_f$ and $t_b$, respectively, are the forward and return/backward swing times. T is the whole swing cycle or period which also corresponds to the whole PWM cycle/period.

In this embodiment, $t_f = t_b = T/2 = 750$ ms. $T = t_f + t_b = t_{on} + t_{off} = 1500$ ms. The swing frequency is 40 times per minute, so the swing cycle $T = 1.5$ seconds $= 1500$ ms. T, $t_f$ and $t_b$ are constant values. $t_{on}$ is a variable value, fixed at the following increments for swing amplitude settings 1 (minimum.)-6 (maximum), respectively: 167 ms, (1:8); 188 ms, (1:7); 214 ms, (1:6); 250 ms, (1:5); 300 ms, (1:4); and 375 ms, (1:3). The 'soft start' on-time is 500 ms The power switching transistor will be turned on during the voltage on-time, powering the motor to impel the swing forward (counter clockwise) as shown in FIGS. 1 and 2. Point A, at the rising edge of the pulse, is the start both of the forward swinging movement and of the PWM cycle.

At point B, the falling edge of the pulse, the switching transistor will be turned off and no voltage will be applied to the motor, but the forward motion of the swing will continue until stopping at uppermost point C. The return (clockwise) swinging movement starts from Point C and ends at Point E, (see FIG. 1 and FIG. 3), during which no voltage is applied to the motor, so that the swing falls back under gravity while rotating the motor armature which causes an EMF/voltage to be induced in the motor coils, as shown by the curves $CD_1E$, $CD_2E$ or $CD_3E$ of FIG. 1 where D indicates the peak value of the induced or generated voltage.

Figure 4:
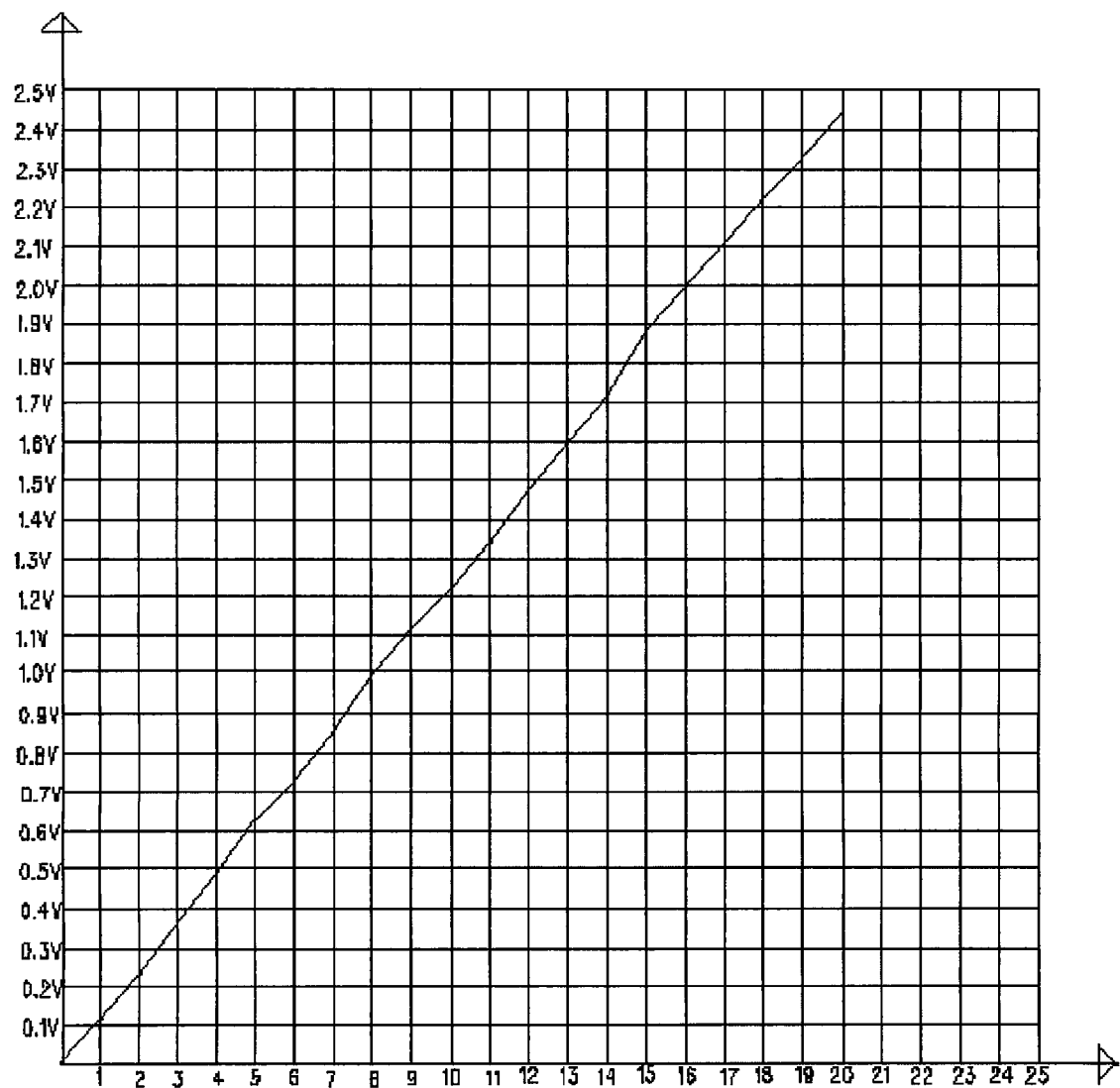
FIG. 4 is a graph showing the variation in detected peak value of terminal voltage with swing amplitude.

The induced voltage increases with motor velocity which corresponds here with the angle of rotation of the motor as determined by swing amplitude. In fact, as shown in FIG. 4, the induced EMF increases linearly with the swing amplitude, enabling the swing amplitude to be checked by measuring the voltage at the motor terminals. Any deviation from a desired amplitude is determined by a comparator circuit which compares the voltage/EMF measured at the motor terminals with the predetermined voltage value corresponding to the desired amplitude.

As substantially no EMF is generated at both stopping points C and E (maximum height) they are termed synchronous points 9 (also zero-crossing points, although the voltage may be 0.3 v). As point E coincides with A, E marks both the end of the whole PWM cycle and the start of the next new cycle enabling use of E as synchronous point detection by synchronous point detection.

It will be appreciated that, powered operation of the motor must synchronize/resonate with swing frequency to provide reliably stable swing amplitude.

Regarding synchronism, two factors are important:
  The resonant frequency is 40 times per minute. So the whole PWM cycle is 1.5 sec.
  The motor is powered up at point A of every whole cycle which point is almost coincident with point E, so when the synchronous point detection circuit detects the point E (also known as synchro point), point A is also obtained and synchronously driving is also started.
The micro electric generator's formula is:

$$e = B\, Vm\, L\text{coil}$$

Where,
e for electromotive voltage
B for magnetic flux
Vm for motor rotary velocity
Lcoil for length of coil The velocity of swing:

$$Vs = \sqrt{2g(1-\overline{\cos\theta})Ls}$$

Where,
Vs for velocity of swing
g for gravity
Ls for length of swing arm
θ for swing angle from the point C to the point E.

$$Vm = K\, Vs$$

Where K is a coefficient of gear mechanism
The Electromotive voltage formula:

$$Vs = B\, L\text{coil}\, K\sqrt{2g(1-\overline{\cos\theta})Ls}$$

Figure 5:
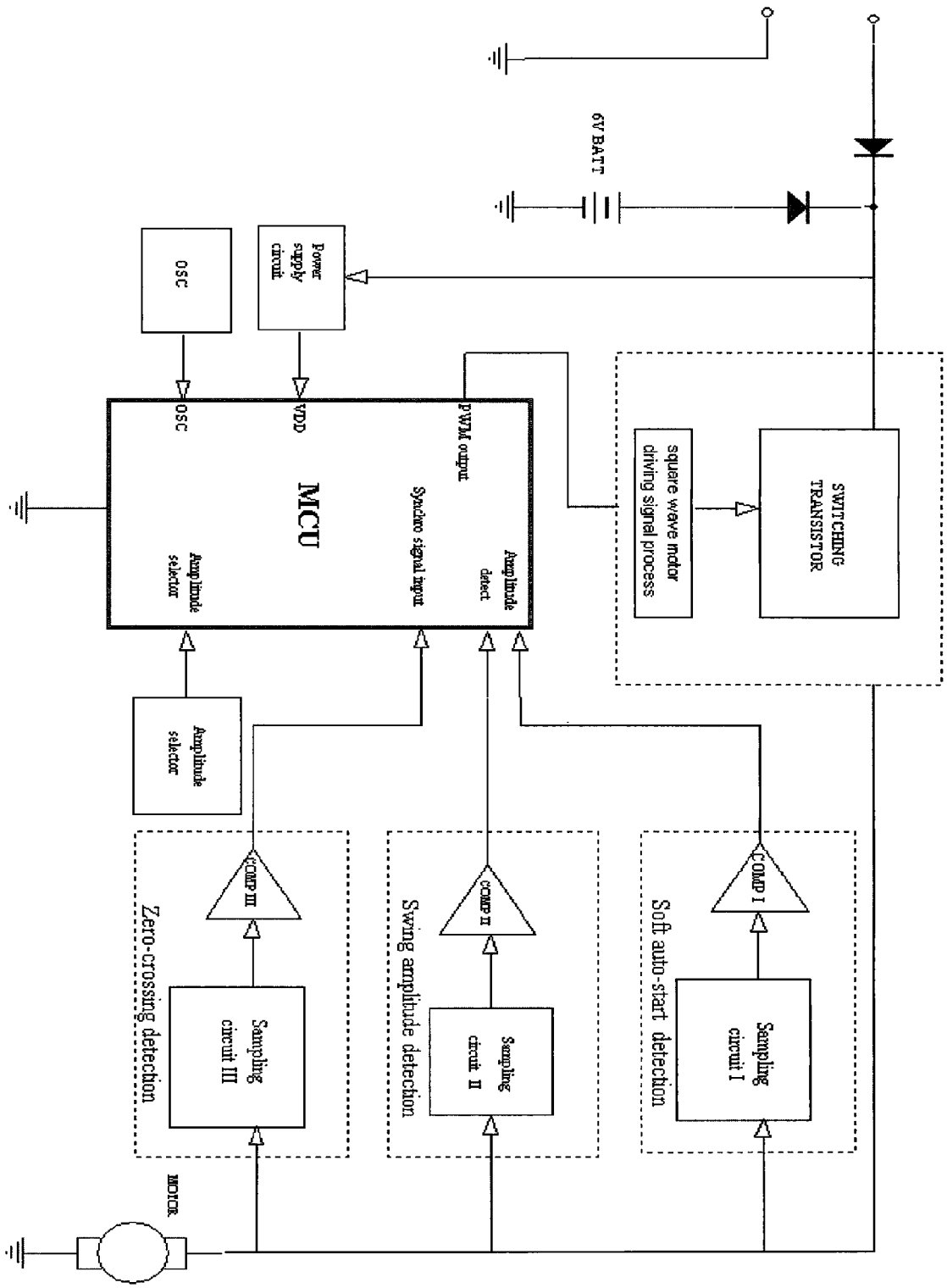
FIG. 5 is a block diagram of the control system.
Figure 6:
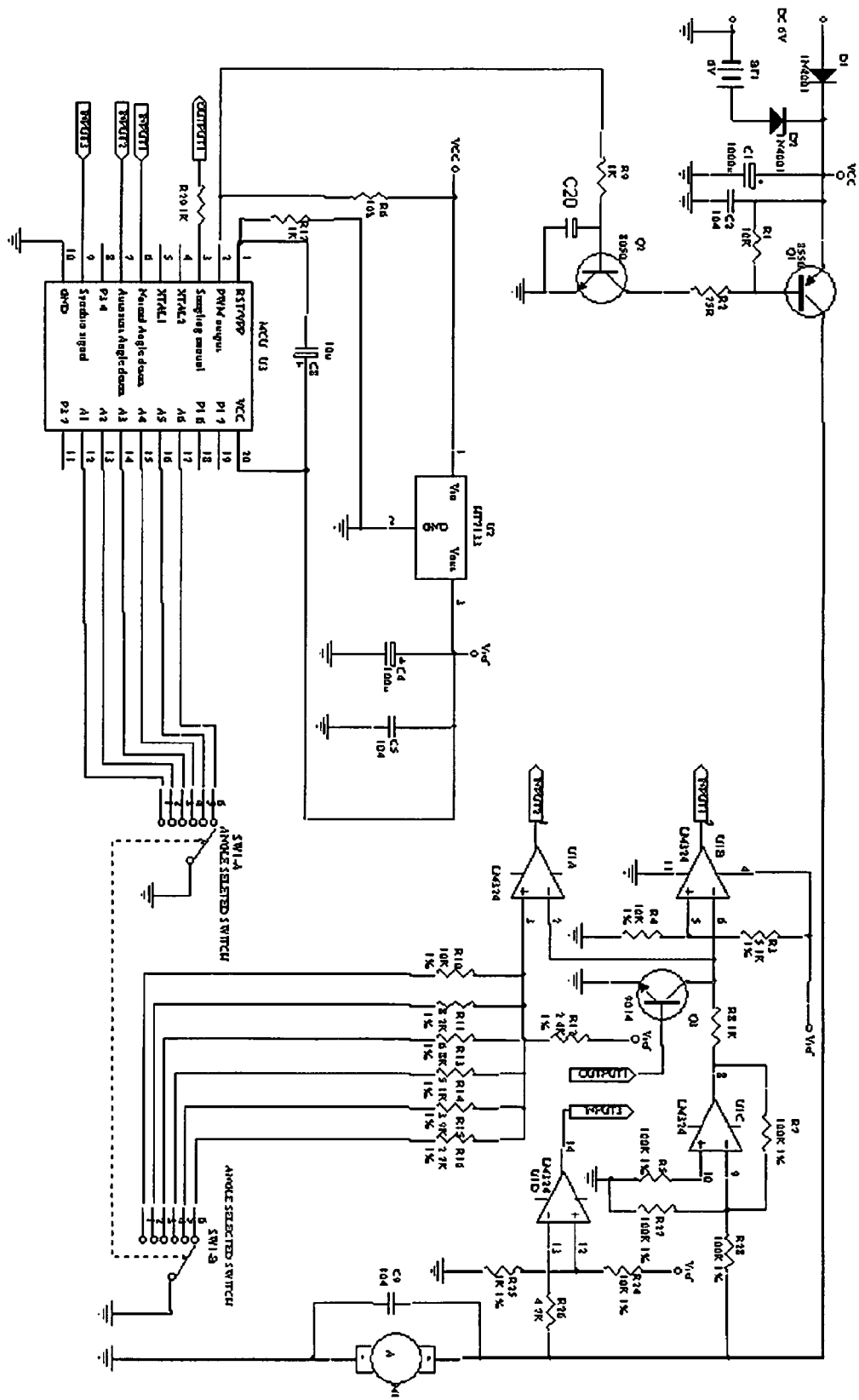
FIG. 6 is a diagram of the operating circuitry.

Referring now to FIGS. 5 and 6, PWM signal voltage is supplied to the motor by a switching transistor circuit consisting of Q1, Q2, R1, R2, R9 and R6. The PWM signal is output from Pin 2 of the CPU (MCU) which adjusts the voltage on-time based on the status of the voltage detection circuit, as described below A 'soft' auto start detection circuit checks the swing amplitude start and consists of U1C, U1B, $Q_3$, $R_3$, $R_4$, $R_5$, $R_7$, $R_8$, $R_{27}$ and $R_{28}$.

A swing amplitude detection circuit consists of $U_1C$, $U_1A$, $Q_3$, SW1-B, $R_5$, $R_7$, $R_8$, $R_{27}$, $R_{28}$, $R_{10}$~$R_{16}$ and $R_{29}$. The 6-position amplitude selector SW1-A &SW1-B switches select desired amplitudes and set the comparator's threshold, so a reference threshold voltage is specified. (The switches simply change the reference voltage of the comparator $U_1A$ by connecting a relative resistor to ground). When the circuit captures a motor terminal voltage reaching a specified threshold, corresponding to the swing amplitude reaching a selected height, the high level of pin 1 of $U_1A$ goes to low, signaling the CPU to reduce the on-time to maintain the existing amplitude. (The CPU adjusts the on-time from a selected one of 167, 188, 214, 250, 300 and 375 ms to 50 ms). Ideally, the amplitude is measured twice per cycle, but in practice, satisfactory swing amplitude regulation can be obtained by only a single measurement every few cycles.

As mentioned above at the synchronous (or zero crossing) point E (FIG. 1), the induced voltage approaches zero (0.3 v) marking both the end of one whole PWM cycle and the starts of the next cycle. The synchronous (or zero) point detection circuit consists of $U_1D$, $R_{24}$, $R_{25}$ and $R_{26}$. At the synchronous point E, the reference voltage of pin 12 of U1D approaches zero and the high level of pin 14 of comparator $U_1D$ goes to low, signaling the CPU of the start of the next cycle. Thus, the CPU can trigger the PWM circuit to start to drive the motor precisely at every point E, assuring synchronous driving.

The CPU (MCU) detects auto start status, amplitude height and synchronous point and then adjusts the PWM timing suitably via the switching transistor to drive the motor synchronously to make the swing reach the selected amplitude height. The CPU obtains a user's selected amplitude by reading the input port status of pin12~pin17.

A 'watch dog' feature is placed on the CPU to prevent the program running with dead nesting to enhance product reliability.

A test mode is also built in the CPU for easy manufacturing processes.

The power supply circuit consists of $D_1$, $D_2$, $C_1$, $C_2$, $C_4$, $C_5$ and the voltage regulator of $U_2$ and provides a regulated and filtered voltage to the CPU and OP-AMP, so that the external detection circuit operates with precision.

The CPU utilizes a RC type, internal oscillator to minimize external components for cost saving.

The square wave motor driving signal is processed by resistor R9 and a capacitor C20 provide a small delay and smoothing effect at A and B for extending motor life.

For auto start, the circuitry, Op-Amp U1C and resistors $R_5$, $R_7$, $R_8$, $R_{27}$ and $R_{28}$ provide a Negative Adder Amplifier which samples and processes negative signals in the signal power supply circuit so that a negative peak voltage at point D is processed as positive signals.

Transistor $Q_3$ is controlled by the CPU as an eliminator and is always on except at point D, the peak induced voltage, so that all other voltage signals incoming via this path are bypassed to ground to prevent spuriously triggering of the CPU. Based on the count of the internal clock of the CPU, $Q_3$ will be off when D is reached resulting in the peak induced voltage signals being applied to pin 6 of comparator U1B and compared with the reference voltage of pin 5. When the peak induced voltage signals reach or exceed the reference voltage of pin 5, the high level of pin 7 of U1B goes to low signaling the CPU to execute the first interrupt subroutine.

The CPU then clears Auto start flag, sets the Driving flag, adjusts on-timing of PWM, return from interrupt subroutine. This means that Auto start is established, the CPU signals the external switching transistor to provide the suitable on-time for the PWM to drive the motor precisely and synchronously.

For swing amplitude detection, the negative input adder-amplified circuit and $Q_3$ function are described above, The comparator consists of Op-Amp U1A, $R_{10}$~$R_{16}$ and SW1-B.

SW1-A & SW1-B is a synchronously rotation switch with 2 pole-6 position. SW1-A is used to select the specified amplitude, SW1-B is also used to connect the relative resistor to ground for reference voltage changing and threshold setting which varies relative to a specified amplitude.

To be processed, (peak) voltage induced at D is applied to pin 2 of comparator U1A, when applied signals reach or exceed the selected trigger threshold of pin 3, then the normal high level of pin 1 goes to low signaling the CPU to run the second interrupt subroutine.

The CPU clears the Driving flag and sets the Maintain flag as the swing amplitude has reached the specified height, (detection circuit sends out the INT request). The CPU stops running Driving mode and jump to maintain subroutine. The CPU sends out PWM with 50 ms on-time to external switching transistor to maintain the amplitude. After several cycles, CPU sets Driving flag and clears maintain flag again as, after several cycles, energy losses cause a small reduction in the swing amplitude, so compensation is required.

The CPU runs relative routine automatically, base on flag status so that the CPU will drive motor with suitable PWM on-time to increase the amplitude by a small amount. When the amplitude reaches a specified height, the detection circuit again sends the INT request to the CPU, and the cycle is repeated throughout swing operation.

The synchronous point detection circuit is constructed as Op-Amp $U_1$D, $R_{24}$, $R_{25}$ and $R_{26}$. The reference voltage at pin 12 is around 0~0.19V. The zero crossing (synchronous point) with small overshoot is around 0.2~0.3V and greater than pin 12's specified threshold limit, (0.1~0.19V) so a normal high level of pin 14 goes to low to ask CPU responding the interrupt request.
The CPU jump to the third INT routine to set synchronous flag & PWM cycle ending flag, clears other flags and etc., so the CPU can apply PWM driving signals at the point A, the start of a new cycle.

As mentioned above, to extend motor life, the square wave motor driving signal process circuit (R9&C20) effectively delays the rising and falling edge times of the square wave signal driving the motor (smoothing) to appropriate balanced value

SPECIFICATIONS

Operational Voltage: DC 6V±30%
  Using 4 pcs "LR20" type battery or DC adapter with 6V/1.2 A.
Operational Current
  Max. Peak current: ,ø680 mA.
  Average current at different swing amplitude setting.
  setting (1) and (2) ,ø150 mA.
  setting (3) and (4) ,ø200 mA.
  setting (5) and (6) ,ø250 mA.
Swing Amplitude Angles:

| Amplitude setting | 0~15 lbs loading | 15~30 lbs loading |
|---|---|---|
| Setting (1) | 15° ± 2° | 14° ± 2° |
| Setting (2) | 18° ± 2° | 16° ± 2° |
| Setting (3) | 21° ± 2° | 18° ± 2° |
| Setting (4) | 24° ± 2° | 20° ± 2° |
| Setting (5) | 27° ± 2° | 22° ± 2° |
| Setting (6) | 30° ± 2° | 24° ± 2° |

2.4. Load Capacity: 0~30 lb

The invention claimed is:
1. A method for controlling the amplitude of a swing powered by an electric motor comprising the steps of detecting a difference from a predetermined reference value of a current value of voltage induced in the motor by swinging movement of the swing and which is representative/dependent of swing amplitude and adjusting power supplied to the motor during a swing cycle to compensate for the difference thereby to bring the swing amplitude to a preselected amplitude.

2. The method of claim 1 wherein the reference value and the current value are measured at corresponding points in the swing cycle during swing movement when the motor is not under power and providing a signal signifying a difference which is fed back to a motor controller for adjustment of the power fed to the motor during the swing cycle thereby to compensate for the difference in swing amplitude.

3. The method of claim 2 wherein the electric motor is powered by a PWM signal having a voltage on-time which is adjusted to adjust the power supplied to the motor.

4. The method of claim 2 or 3 wherein a peak value of the induced voltage is measured corresponding to the maximum velocity of the swing at the lowest point of the swinging movement.

5. A device for controlling the amplitude of an electric motor powered swing comprising:
  an electric motor operatively connected to the swing;
  a motor controller for adjusting electrical power supplied to the motor;
  a swing amplitude detection circuit connected to motor coil terminals to measure a current voltage induced in the motor coil only by current swing movement;
  means for providing selected reference voltages corresponding to respective predetermined voltages induced in the motor coil only by swing movement at selected swing amplitudes;
  means for comparing the current voltage with a selected reference voltage and for providing a difference signal to the motor controller so as to adjust the electrical power supplied to the motor to bring the current swing amplitude to the selected swing amplitude.

6. The device of claim 5 wherein the motor controller supplies power to the motor for only a part of the swing cycle and the selected reference voltages correspond to peak voltages induced in the motor coil at a point in the swing cycle when the motor is not powered and the current voltage is measured at a corresponding point in the swing cycle.

7. The device of claim 6 wherein the motor controller provides a PWM signal to power the motor and adjusts the on-time in response to the difference signal to adjust the power supplied to the motor.

* * * * *